Figure 1:
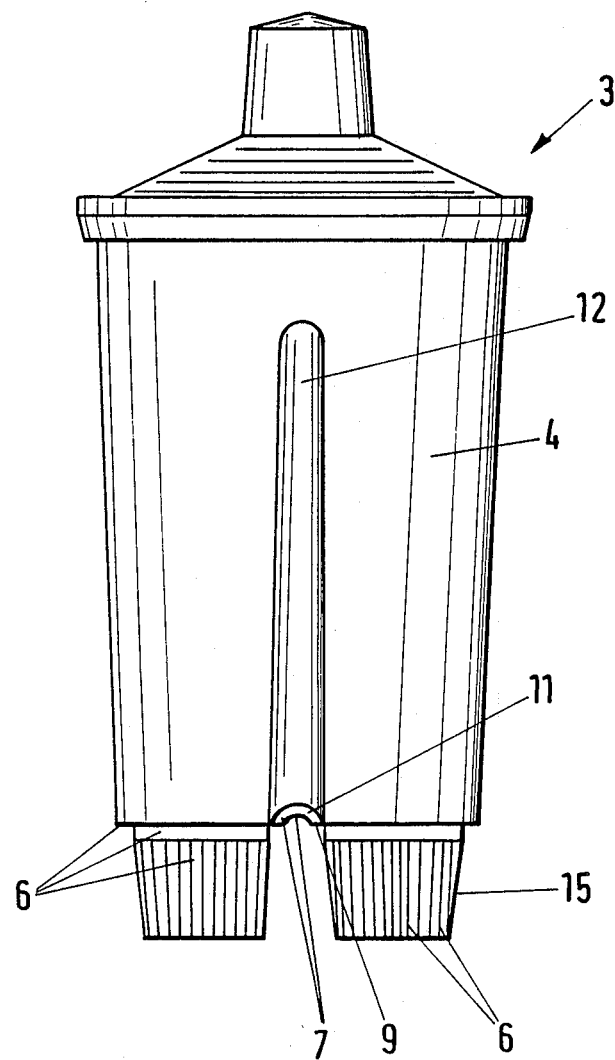

United States Patent [19]
Hankammer

[11] Patent Number: 4,969,996
[45] Date of Patent: Nov. 13, 1990

[54] WATER PURIFICATION DEVICE WITH AN INTAKE FUNNEL

[75] Inventor: Heinz Hankammer, Taunusstein, Fed. Rep. of Germany

[73] Assignee: Brita Wasser-Filter-Systeme GmbH, Taunusstein, Fed. Rep. of Germany

[21] Appl. No.: 316,799

[22] Filed: Feb. 28, 1989

[30] Foreign Application Priority Data

Mar. 26, 1988 [DE] Fed. Rep. of Germany ....... 3810441

[51] Int. Cl.$^5$ .............................................. B01D 24/22
[52] U.S. Cl. .................................... 210/282; 210/470; 210/472; 210/476
[58] Field of Search ............... 210/474, 476, 238, 282, 210/291, 477, 470

[56] References Cited

U.S. PATENT DOCUMENTS 2,465,623  3/1949  Zika ..................................... 210/476

OTHER PUBLICATIONS

German Utility Model No. G 85 18 951.0, 12/5/85.

German Publication No. DE 3535677 A1, 4/16/87.
German Publication No. DE 3535679 A1, 5/7/87.

*Primary Examiner*—Robert Spitzer
*Attorney, Agent, or Firm*—Paul & Paul

[57] ABSTRACT

Described is a water purification device having an intake funnel (1), a sleeve (2) which is sealingly connected thereto and an insert which has approximately cylindrical side walls (4), a filter cover (5) and a filter bottom (6) and in which a granulate-type purification agent can be introduced.

So that any gases and/or air which accumulates no longer impede the flow of water to be purified through the filter bottom (6), in accordance with the invention it is provided that the filter bottom (6) has an air collecting space (7) which is extended upwardly at least partially towards the side wall (4); wherein preferably the air collecting space (7) is in the configuration of half-tubes (11) which are open downwardly and outwardly of the bottom and which are connected to each other and to a chimney-like half-tube (12) which extends over the side walls (4).

9 Claims, 4 Drawing Sheets

WATER PURIFICATION DEVICE WITH AN INTAKE FUNNEL

The invention relates to a water purification device having an intake funnel, a sleeve which is sealingly connected thereto and an insert which has approximately cylindrical side walls, a filter cover and a filter bottom and in which a granulate-type purification agent can be introduced.

Devices of the above-indicated kind are known. By means thereof, the water to be purified is intended to flow out of the intake funnel which can be filled with water through a purification agent, for example an ion exchanger, activated carbon or the like, through the insert, and can be collected in purified form in a collecting container. The important consideration involved is the purification action which is experienced by the water flowing through the insert, in the purification agent. Therefore, on the one hand that is a wish for a good flow of water through the purification agent, while on the other hand a certain residence time is desired. So that the purification agent in granulate form does not mix with the water to be purified, the insert is provided with a filter member at its top side which is towards the wide part of the funnel and at its underside. It is initially assumed that the fluid can readily pass into the insert through the filter slots, can flow through the purification agent and can issue again at the bottom through the filter bottom. It has been found however that the filters may become partially blocked, with the result that the through-flow of water is considerably slowed down or disturbed. Various steps to prevent the filter slots on the filter cover from becoming blocked have already been taken. It has also been possible to provide at the bottom end that blocking of the filter slots by fine particles of granulate material can be essentially prevented. However it is not possible to prevent gases from being formed by purification of the water within the insert, due to certain chemical reactions, which gases seek to flow upwardly and outwardly out of the insert or are entrained by the flow of water passing therethrough to the filter bottom where they have to escape. Other small sources of air above and within the insert have from time to time led to the result that a small air and/or gas bubble is formed under the filter bottom; that bubble periodically becomes detached from the sleeve at the bottom thereof and moves upwardly, but before becoming detailed, it the through-flow of water to be purified.

An insert for such a water purification device has admittedly already been provided, which comprises a generally cylindrical cup containing the filter material and a closure filter member which can be fitted cover-like on to the cup. When the bottom of that cup was also in the form of a filter member, the problem of the air bubble being formed at the lower end of the sleeve still arose. If however an internally disposed cylindrical tube was kept free so that the last filter member was arranged in the upper region, then that resulted in space being lost for disposing the purification agent. The problem of removing air from the lower region of the insert and the sleeve was therefore still not satisfactorily solved.

The present invention is therefore based on the problem of so improving the water purification device of the kind set forth in the opening part of the specification that any gases and/or air which accumulates no longer impede the flow of the water to be purified through the filter bottom.

In accordance with the invention that problem is solved in that the filter bottom has an air collecting space which is extended upwardly at least partially towards the side wall. It has been seen that the air which collects at the lower or outer end of the insert and therewith also the sleeve of the intake funnel is inevitable and also cannot be readily removed within the insert. Therefore an air collecting space was provided in the region of the filter bottom, where the gases or air which occur can collect, without impeding the proper operation of the water purification device. In order to keep the through-flow of water brisk, it is particularly advantageous if the air collecting space is extended upwardly towards the side wall. It is sufficient for only an e.g. tubular part of the region of the filter bottom to be extended radially outwardly to the size and then towards the filter cover. It is obvious that air seeks to escape upwardly so that it is precisely the upwardly extended air collecting space that traps the gases and/or air formed and removes same from the region of the filter bottom where that air would be undersirable. Accordingly the filter openings in the bottom can be kept free of undesired air or a gas mixture, and the through-flow of water remains undisturbed.

Desirably a further embodiment of the invention provides that the air collecting space occupies a part of the area of the filter bottom and is closed towards the interior of the insert. In contrast to the openings in the filter bottom therefore the air collecting space is closed towards the side of the insert. It is possible to image a system of tunnels which are open downwardly, for here it extends freely outwardly while they are closed upwardly and do not have any filter openings. The gas which is possibly urged by pressure through the filter openings arranged therebeside can then slide into the tunnel-like volumes and there be collected or passed into the upwardly extending region which should preferably be connected to the individual tunnels.

A preferred embodiment of the invention is therefore characterised in that the air collecting space is in the shape of half-tubes which open downwardly and/or outwardly of the filter bottom and which are connected to each other and a further half-tube which is substantially chimney-shaped and which extends over at least a part of the side wall. The further chimney-like half-tube is that part of the air collecting space which is extended upwardly towards the side wall. It is larger in the region of the filter bottom and decreases in size towards the upper space of the insert, that is to say towards the cover, and it is for that reason that that half-tube is referred to as being chimney-like. That tube is also cut off in half in cross-section so that the laterally extended part of the air collecting space is also open outwardly towards the side. It will be seen that an air collecting space is formed by insertion of that so-called insert which can also be referred to as a filter cartridge, into the sleeve of the intake funnel. The sleeve walls embrace the insert at least in the lateral region so that the air which occurs in the lower area in the region of the filter bottom can actually be collected in the chimney-like half-tube of the air collecting space. The sleeve must be open downwardly for the water issuing from the filter bottom of the insert must be capable of also flowing downwardly and outwardly.

In that connection in accordance with the invention it is desirable if the outwardly open half-tubes of the air collecting space, which are disposed in the region of the filter bottom, extend in a star-like configuration and preferably radially from the outside edge of the filter bottom towards the centre thereof. It is possible to image the tunnel system as outwardly open half-tubes of the air collecting space, which are arranged in a star-like configuration, so that at every point on the filter bottom, air which is urged out of the openings thereof can flow into an adjacent half-tube and can be passed upwardly into the chimney-like half-tube of the air collecting space. Although the filter bottom may be of various configurations, a filter member however generally has limb portions which are disposed around the openings and which, in a radial design configuration, can thus at the same time form at least a part of the outwardly open half-tubes of the air collecting space. The advantageous close proximity of those half-tubes of the air collecting space to the openings of the filter bottom will be apparent so that gases formed or air urged through the openings, in the whole region of the filter bottom, can be immediately discharged into the half-tubes and collected in the collecting space.

The half-tubes of the air collecting space occupy only an immaterial part of the volume of the insert for receiving the purification agent. So that the improvement in function of the novel water purification device can be even more advantageous and any reduction in volume that may be feared, due to the various half-tubes of the air collecting space, is compensated for, the invention further provides that the filter bottom has at least one filter projection which projects substantially perpendicularly out of the surface thereof. As its name indicates, that filter projection is to be disposed on the filter bottom in projecting relationship and is advantageously to extend downwardly/outwardly. In that arrangement it is particularly advantageous if the openings in the region of the filter projection are in the form of short slots which are arranged in substantially mutually parallel relationship in a ring-like configuration in the surface of the filter projection. The surface of the filter projection is preferably that of a truncated cone, with the reducing end disclosed downwardly. The bottom surface which terminates the truncated cone downwardly on the outside thereof can be closed or may also be provided with filter openings. By virtue of the surface of the filter projection being of such a configuration, air which is pressed out with the water can issue towards the side from the slots in the filter projection and can be immediately carried away upwardly outside the sleeve. That also causes a reduction in the air bubble which is formed in the region of the filter bottom and preferably below same. The frustoconical filter projection is directly in communication with the internal space in the insert so that it can be filled with purification agent. It will be seen that that therefore increases the receiving volume of the insert. In addition the air which issues is only partly passed into the air collecting space because in the manner described above, a certain proportion of the air which is otherwise passed downwardly escapes towards the side and upwardly past the sleeve.

It will be appreciated that the filter projection is of such a configuration that it sticks out downwardly from the sleeve of the intake funnel, so that a conventional insert as is available on the market at the present time can be fitted into the sleeve of the intake funnel, as well as the novel insert with or without the filter projection. The air collecting space also does not occupy any additional volume in such a way that for example the novel insert could no longer be disposed in the conventional sleeve. That ensures that the old insert can advantageously be replaced by the novel insert. The end consumer can purchase novel insert types at any time but nonetheless use his old intake funnel with sleeve.

It is also desirable in accordance with the invention if the air collecting space is arranged beside the at least one filter projection and sealingly connected thereto. That does not adversely affect the function of the air collecting space and the function of the purification device is enhanced for sealingly connecting the filter projection to the filter bottom guarantees that the water is also passed into the purification agent within the filter projection so that the bed height of purification agent is enhanced.

It is also advantageous in accordance with the invention if the sleeve on the intake funnel is provided at its bottom with an injection cross having four openings for holding four filter projections of the insert in such a way as to pass therethrough downwardly and/or outwardly, in such a way that the air collecting space is above the region of the cross.

Although the underside of the sleeve may be formed by a radial internal flange for holding the insert, it is however desirable, for reasons concerned with manufacturing procedure, strength and also greater simplicity of use, to provide an injection cross at the lower end of the sleeve, forming openings between the radially extending limb portions of the cross. The filter projections may now extend through those openings. Preferably, in the case of a true cross with four limb portions, there are four openings so that the insert should carry at its underside four filter projections which fit precisely into the openings in the cross. In that way for example the whole of the filter bottom may be so redesigned that the filter openings are only to be found in the filter projections which may all be of a substantially frustoconical configuration. In that case, all that remains of the filter bottom is the region within the four filter projections, which is shaped similarly to a cross, so that the half-tubes of the air collecting space, which extend along that cross, at the same time may also be arranged above the limb portions of the injection cross in order to make optimum use of the available space. In that connection it will be self-evident that the lower edges of the half-tube shell portions of the air collecting space are to be disposed at a spacing from the injection cross of the sleeve so that the air which issues laterally from the filter projections and which did not have an opportunity immediately to escape upwardly outside the sleeve can also pass into the air collecting space.

In another advantageous embodiment of the invention the air collecting space, in the region of the chimney-like half-tube, extends into the upper quarter of the side wall of the insert and in the region of its upper end (of the half-tube) has an opening for discharge of the accumulated air or gas. Although the opening in the sleeve makes it necessary to purchase a new water purification device with intake funnel and sleeve, the new device however has the considerable advantage that the air collecting space can be very small while nonetheless all air which issues in the region of the filter bottom can be collected, by way of the half-tubes, passed into the chimney-like vertical half-tube and discharged therethrough upwardly through the opening in the sleeve.

It is also advantageous in accordance with the invention for a preferably wedge-shaped guide rib to be disposed on the inward side of the substantially cylindrical sleeve. In the foregoing description it was assumed that the sleeve is substantially cylindrical both on the outside and on the inside, with the sleeve being provided in its lower part with an injection cross, in the preferred embodiment described above. Now, due to the above-mentioned guide rib, a kind of rib or fin portion projects radially inwardly on the inward side of the sleeve. That rib or fin portion corresponds to the configuration of the chimney-like half-tube at the side wall of the insert in such a way that the insert with its air collecting space and the lateral perpendicular half-tube can admittedly be fitted completely into the new sleeve with the guide rib, but only in a specific rotational position. If the end consumer pushes the insert downwardly into the sleeve in the wrong angular position, the insert encounters an obstruction for its cylindrical outside wall strikes against the radially outward upper edge of the guide rib. The insert cannot then be completely fitted into the sleeve, and in particular when filter projections are provided thereon, they do not project through the injection cross. On the contrary, the guide rib according to the invention ensures that the insert is in the correct angular position when it is introduced into the sleeve so that particularly when the filter projections are provided, they fit precisely into the openings between the limb portions of the cross. That facilitates and guides insertion of the filter cartridge (the insert). As therefore the chimney-like half-tube of the air collecting space is intended to accommodate the wedge-shaped guide rib and is intended to come into engagement therewith, the configuration of the wedge-shaped guide rib is matched to the shape of the chimney-like half-tube of the air space. If in accordance with the foregoing embodiment the half-tubes of the air collecting space, which are in the region of the filter bottom, lie above the limb portions of the injection cross, then the wedge-shaped guide rib on the sleeve will also lie in line with such a limb portion of that cross arrangement. In addition the wedge-shaped guide rib preferably extends from the bottom of the sleeve to below the opening if the specific embodiment has both the wedge-shaped guide rib and also the opening. So that one insert is interchangeable with the other and one sleeve is interchangeable with the other, even in a construction without an opening in the sleeve, the wedge-shaped guide rib will however extend upwardly only as far as the location which is outside the position at which the opening could be provided.

Further features, advantages and possible uses of the present invention will be apparent from the following description of preferred embodiments in conjunction with the drawings in which:

FIG. 1 shows a side view of the insert without an intake funnel and without a sleeve, viewing in the direction of the chimney-like lateral vertical half-tube.

Figure 2:
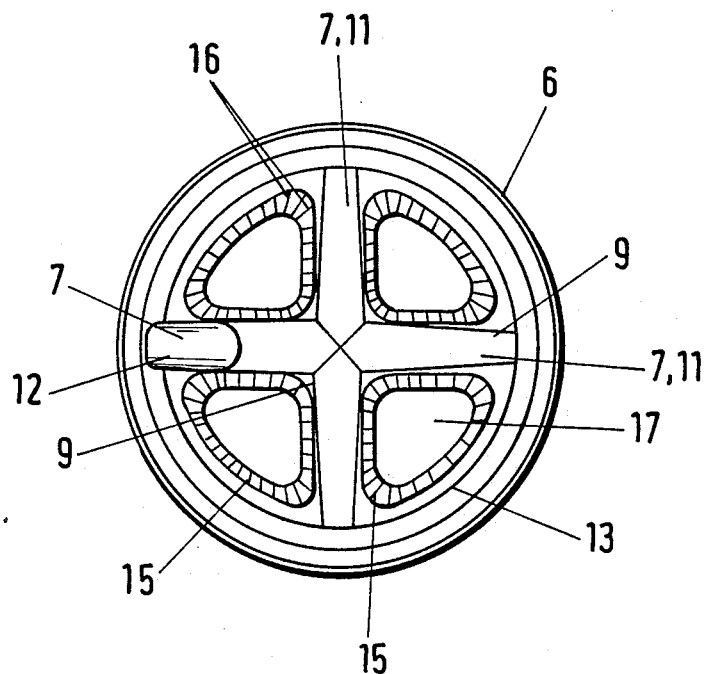
Figure 3:
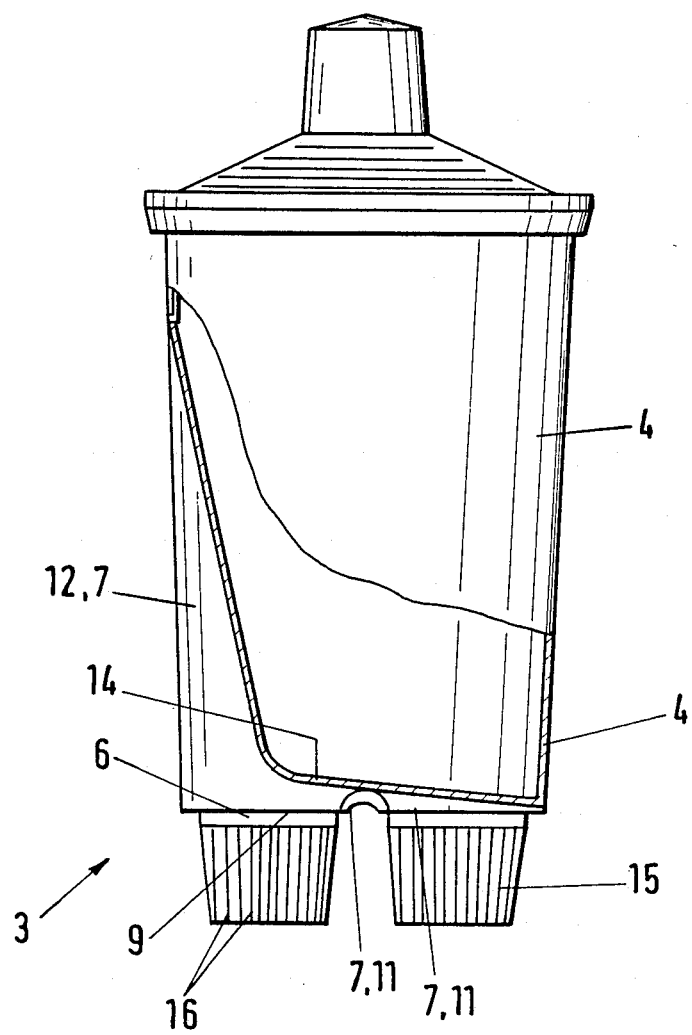
Figure 4:
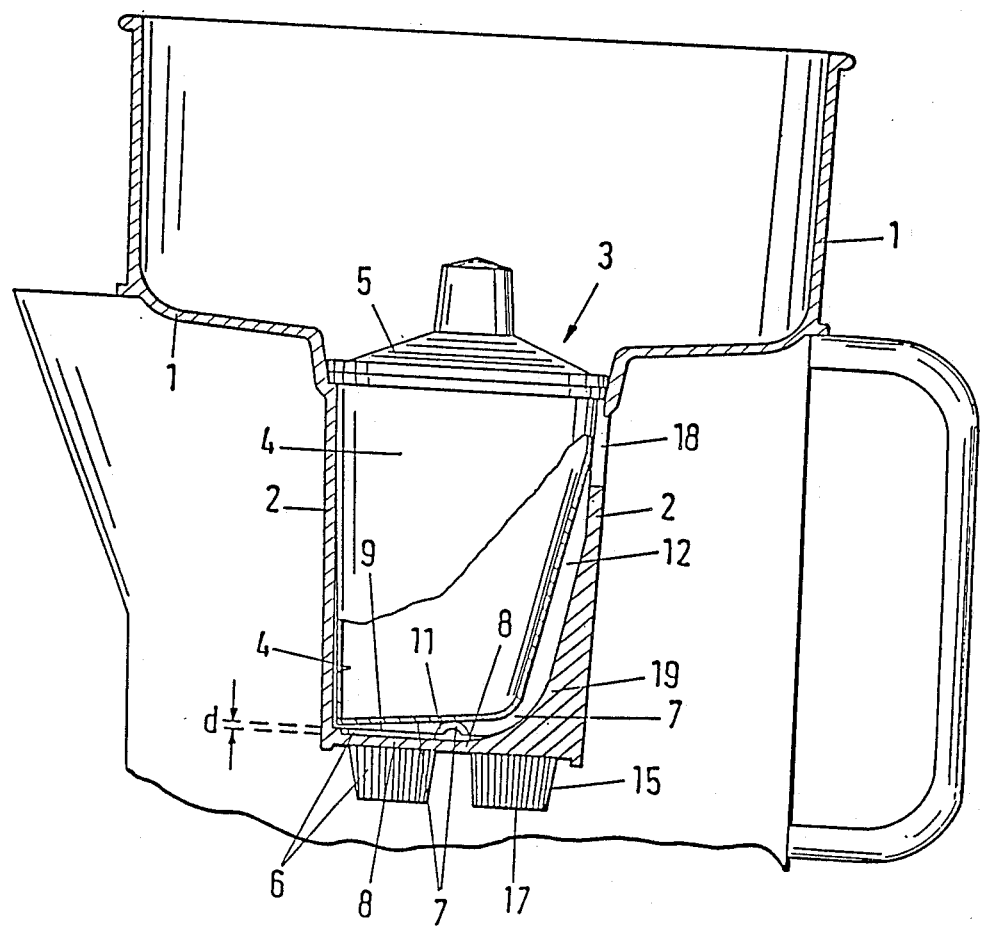

FIG. 2 is a view on to the insert from the side of the filter bottom, that is to say upwardly in FIG. 3, FIG. 3 is a partly broken-away view of the insert, showing a part of the side wall and a part of the lateral vertical half-tube in the chimney configuration in section, and FIG. 4 is a similar view of the insert to that shown in FIG. 3, but additionally showing the sleeve with the guide rib, the intake funnel arranged thereabove and, in broken-away form, the collecting container.

As the collecting container is not essential and may possibly also be of a different configuration, it is only shown in broken-away form in FIG. 4, in thin lines, without a reference numeral.

The water purification device itself is shown in its essential components in FIG. 4. Specifically, it comprises the intake funnel 1, the sleeve 2 which is sealingly connected thereto and the insert which is generally identified by reference numeral 3.

The insert in turn has substantially cylindrical side walls 4, a filter cover 5 and a filter bottom 6. The purification agent is not shown but can be readily imagined in the space of the side wall 4.

The particular configuration of the filter bottom 6 has an air collecting space 7. The air collecting space 7 comprises individual parts which, in addition to reference numeral 7, are identified by other reference numerals, as set out below.

The lower edges 9 of the air collecting space 7 are disposed in a cross configuration, as shown in FIG. 2, corresponding to the injected cross 8 of the sleeve 2 which is shown in FIG. 4, the lower edges 9 being disposed at a spacing d above the top side of the limb portions of the cross 8.

FIG. 2 should be viewed in conjunction with FIG. 3 for, besides the half-tubes 11 which are open downwardly and/or outwardly of the filter bottom 6, the air collecting space which is generally identified by reference numeral 7 also comprises the vertical, lateral half-tube 12 which extends upwardly in a chimney-like shape and which is on the left in FIGS. 1 and 2, which is viewed from the outside in FIG. 1 and which is disclosed at the right in FIG. 4.

The half-tubes 11 of the air collecting space 7, which are arranged in a cross-like configuration like a tunnel system, extend from the circular outside edge 13 of the filter bottom 6 to the centre thereof, with the lower edges 9 of the half-tubes 11 diverging towards the centre, with an increase in the width of the tubes 11. Due to the increase in size of the half-tubes 11 from the outside inwardly, they are also increased in height (or depth, depending on how the view is considered), so that in the sectional side views in FIGS. 3 and 4, the walls defining the open half-tube 11, which are disposed upwardly towards the interior of the insert 3, rise from the outside towards the middle. Only one of the four-tubes constitutes an exception in that respect, namely that diametric limb portion which also includes the lateral vertical half-tube 12. For that reason, in the views shown in FIGS. 3 and 4, the upper walls 14, each are without filter openings, of the half-tube 11 continue to rise from the middle outwardly but then open into the lateral chimney-like half-tube 12.

That system of half-tubes, arranged in a cross configuration in FIG. 2, forms a downwardly open and upwardly closed air collecting space 7 whose half-tubes 11 are connected by way of the centre to each other and, on the left in the views shown in FIGS. 2 and 3, to the further lateral half-tube 12.

The injected cross 8 of the sleeve 2, which is shown only in FIG. 4 but which is disposed in the region of the first half-tubes 11 in FIG. 2, provides four openings (not shown) through which extend four filter projections 15. They are substantially of a frustoconical configuration although it will be seen from FIG. 2 in the view on to the filter bottom 6 from below that they are of substantially triangular cross-section. That results from the shape of the openings between the cross 8, which are also substantially triangular. In order to make optimum use of the space available, the filter projections 15 are of such a configuration that they substantially fill those openings. The openings in the filter projections 15 are in the form of slots 16 and the flat bottom surfaces 17 of the filter projections 15 are closed. The slots 16 forming the openings of the filter bottom 6 are therefore the only openings in the filter bottom.

In operation therefore the air which is pressed out at the bottom from the slots 16 can either flow up laterally at the outside wall surfaces of the sleeve 2 or it passes by way of the open half into the half-tubes 11 of the air collecting space 7 where, as a result of the configuration in respect of height of the upper closed walls 14 of the half-tubes 11, that air is passed directly into the lateral vertical half-tube 12 which is of a chimney-like form, where it is carried upwardly The view of the arrangement shown in FIG. 4 also illustrates an opening 18 at the top in a side wall of the sleeve 2 at a location where the chimney-like half-tube 12 terminates at the top in a direction towards the cover 5, in such a way that upwardly flowing air flows upwardly through the half-tube 12 and escapes through the opening 18 into the collecting container.

Finally, FIG. 4 also shows the wedge-shaped guide rib 19 which is illustrated in sectional form and which fits precisely into the half-tube 12 of the insert 3, comes into engagement with that half-tube, but nonetheless leaves sufficient space that air flowing upwardly in the half-tube 12 of the air space 7 can flow past the wedge-shaped guide rib 19.

When water is introduced into the top of the intake funnel 1 as shown in FIG. 4, it will be seen that the water passes through the diagrammatically indicated slots in the cover 5 into the insert 3 and leaves same through the filter projections 15 by way of the slots 16 to be collected in a purified condition in the collecting container shown in FIG. 4. The air which is entrained in that case and which issues from the slots 16 in the region of the filter bottom 6 passes into the air collecting space 7 and escapes upwardly by way of the lateral half-tube 12 and the opening 18. The function and water purification effect of the novel device is thereby considerably improved.

I claim:

1. A water purification device comprising an intake funnel, a sleeve wherein said sleeve is sealingly connected to said funnel at an upper end of said sleeve, said sleeve further having an opening formed therein, an insert having approximately cylindrical side walls, a filter cover and a filter bottom for accommodating a granulate filter agent therein with means defining an air collecting space, located in at least a portion of the filter bottom, said means defining the air collecting space extending upwardly at least partially towards the side wall and to the opening in said sleeve, with said filter bottom having opening means to allow the passage of filtrate therethrough, and with said filter cover having opening means whereby fluid can be passed into the insert.

2. The device of claim 1 wherein said means defining an air collecting space is defined in part by the filter bottom and has an upwardly extending portion extending toward the interior of the insert.

3. The device of claim 1 or claim 2 wherein said means defining an air collecting space includes partial tubular configurations of generally inverted U-shaped cross-section and which are connected to each other and a further tubular configuration also of generally U-shaped cross-section and which extends over at least a part of the side walls.

4. The device of claim 3, wherein said tubular configurations are in a generally star-like configuration extending generally radially from an outer edge of the filter bottom toward the center thereof.

5. The device of claim 4 wherein said filter bottom has at least one filter projection which extends approximately perpendicularly out of the surface thereof.

6. The device of claim 5, wherein said means defining an air collecting space is arranged beside at least one filter projection.

7. The device of claim 3 wherein said means defining an air collecting space, of the further tubular configuration extends into the upper quarter of the side wall of the insert and to said sleeve opening for discharge of collected air or gas.

8. The device of claim 1 wherein said sleeve is provided at its bottom with four openings for holding four filter projections of the insert, extending downwardly, in such a way that the air collecting space is above the sleeve bottom.

9. The device of claim 8 wherein a preferably wedge-shaped guide rib is disposed on the inward side of the substantially cylindrical sleeve.

* * * * *

UNITED STATES PATENT AND TRADEMARK OFFICE
CERTIFICATE OF CORRECTION

PATENT NO. : 4,969,996

DATED : November 13, 1990

INVENTOR(S) : Heinz Hankammer

It is certified that error appears in the above-identified patent and that said Letters Patent is hereby corrected as shown below:

Col. 1, line 20, "that" should read --there--
Col. 3, line 55, remove "that" immediately after the word --seen--

Signed and Sealed this

Thirtieth Day of June, 1992

Attest:

DOUGLAS B. COMER

*Attesting Officer*  *Acting Commissioner of Patents and Trademarks*